US00RE39417E

(19) United States
(12) Reissued Patent
Barry

(10) Patent Number: US RE39,417 E
(45) Date of Reissued Patent: Dec. 5, 2006

(54) ILLUMINATED GAS TANK OR SHELL

(76) Inventor: James E Barry, 3251 NW. 11th Ave., Coral Springs, FL (US) 33065

(21) Appl. No.: 09/323,636
(22) Filed: Jun. 1, 1999

Related U.S. Patent Documents

Reissue of:
(64) Patent No.: 5,634,706
Issued: Jun. 3, 1997
Appl. No.: 08/468,931
Filed: Jun. 6, 1995

U.S. Applications:
(63) Continuation-in-part of application No. 08/169,999, filed on Dec. 17, 1993, now Pat. No. 5,479,324.

(51) Int. Cl.
*B62J 6/00* (2006.01)
F21V 33/00

(52) U.S. Cl. ..... 362/473; 362/101
(58) Field of Classification Search ..... 362/473, 362/101, 307, 310, 311, 396, 362, 363; 280/835, 280/288.4
See application file for complete search history.

(56) References Cited

U.S. PATENT DOCUMENTS

| | | | | | |
|---|---|---|---|---|---|
| 1,283,983 | A | * | 11/1918 | Udell | 340/495 |
| 1,337,872 | A | * | 4/1920 | Zahnow | 362/505 |
| 1,740,588 | A | * | 12/1929 | Hamilton | 362/473 |
| 2,732,540 | A | * | 1/1956 | MacMahon | 362/473 |
| 2,891,140 | A | | 6/1959 | Huff | |
| 3,358,135 | A | | 12/1967 | Weismantel | |
| 3,970,837 | A | * | 7/1976 | Helm | 362/249 |
| 3,987,294 | A | * | 10/1976 | Carlson | 362/101 |
| 4,000,573 | A | | 1/1977 | Cohen | 40/142 |
| 4,010,967 | A | * | 3/1977 | Renteria, Jr. | 116/114 AE |
| 4,024,388 | A | | 5/1977 | Skoff | 240/7.55 |
| 4,051,361 | A | * | 9/1977 | Lichon et al. | 362/473 |
| 4,320,906 | A | | 3/1982 | Saunders | 280/289 |
| 4,425,602 | A | * | 1/1984 | Lansing | 362/363 |
| 4,515,405 | A | | 5/1985 | Ogishima | 296/78.1 |
| 4,557,517 | A | | 12/1985 | Bolduc et al. | 296/15 |
| 4,559,516 | A | | 12/1985 | Schott et al. | 340/73 |
| 4,779,169 | A | | 10/1988 | Cruze | 362/72 |
| 4,875,142 | A | | 10/1989 | Spector | 362/72 |
| 4,901,209 | A | | 2/1990 | Nitz | 362/72 |
| 5,211,699 | A | * | 5/1993 | Tipton | 362/101 |
| 5,247,431 | A | | 9/1993 | Liu | 362/72 |
| 5,406,465 | A | * | 4/1995 | Farchione | 362/473 |
| 5,479,324 | A | | 12/1995 | Barry | 362/72 |
| 5,508,478 | A | | 4/1996 | Barry | 181/227 |
| 5,561,414 | A | | 10/1996 | Chin | 340/432 |
| 5,615,940 | A | | 4/1997 | Barry | 362/72 |
| 5,634,706 | A | | 6/1997 | Barry | 362/72 |
| 5,669,698 | A | | 9/1997 | Veldman | 362/83.1 |
| 5,709,453 | A | | 1/1998 | Krent et al. | 362/80 |
| 6,152,585 | A | | 11/2000 | Barry | 362/473 |

FOREIGN PATENT DOCUMENTS

| | | | | |
|---|---|---|---|---|
| DE | 555689 | * | 7/1932 | 280/835 |
| GB | 469692 | | 4/1936 | |
| JP | 63227693 | | 12/1988 | |
| JP | 4063734 | | 3/1990 | |

* cited by examiner

*Primary Examiner*—Lee Quach
(74) *Attorney, Agent, or Firm*—Daniel S. Polley, P.A.

(57) ABSTRACT

Disclosed is a double-walled gasoline or fluid tank having a hollow space allowing light to be visible externally through a variety of openings or designs. A concave side portion of an existing tank is removed and a flat side wall, having an illumination device attached thereto, is attached where the original side portion was removed to create a new tank. An opening is created on the original side portion and the original side portion is reattached to the tank. The illumination device provides light through the opening in the original side portion. In an alternative embodiment a lighting device is provided underneath the gas tank to help illuminate the area in front and to the sides of the motorcycle. The lighting device is provided with a reflective surface area which reflects light received a light bulb in the direction in front of the motorcycle and to the side of the motorcycle corresponding to the side of the gasoline tank to which the motorcycle is attached.

24 Claims, 4 Drawing Sheets

Fig. 8
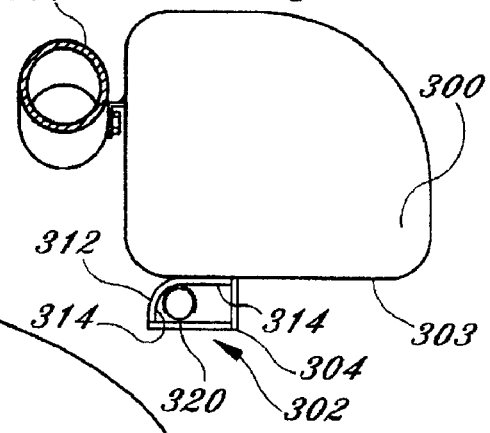
Fig. 9
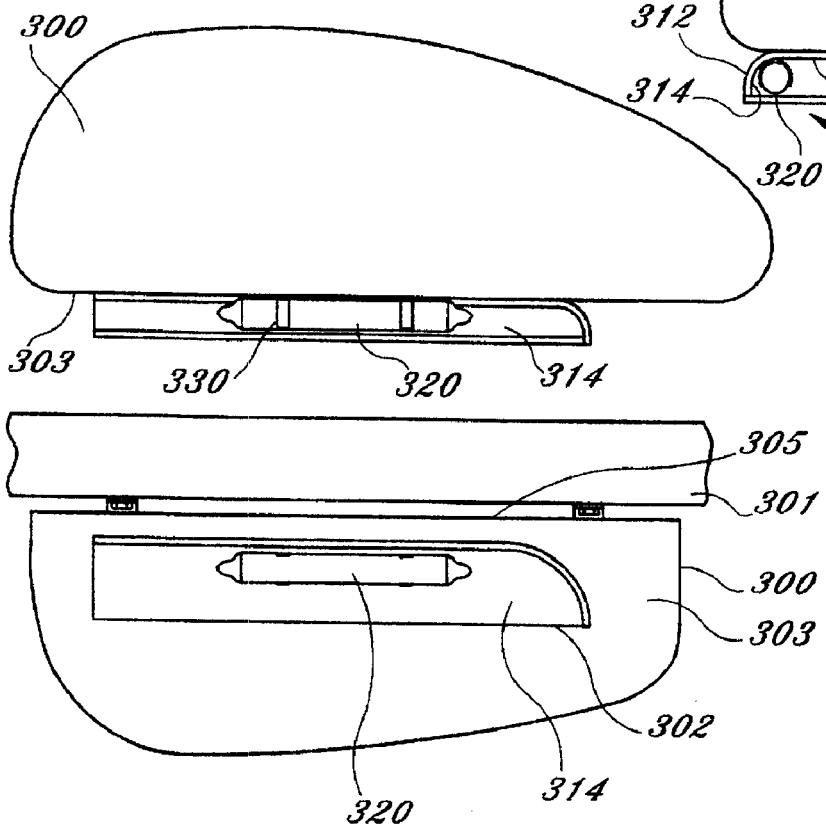
Fig. 10
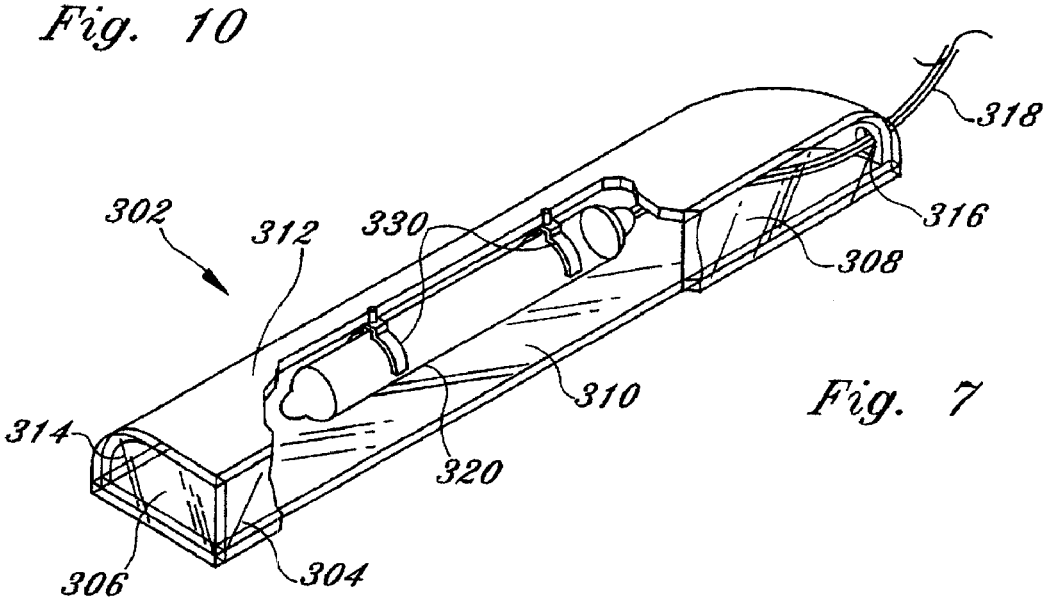
Fig. 7

ILLUMINATED GAS TANK OR SHELL

Matter enclosed in heavy brackets [ ] appears in the original patent but forms no part of this reissue specification; matter printed in italics indicates the additions made by reissue.

This application is a continuation-in-part of U.S. application Ser. No. 08/169,999, filed Dec. 17, 1993, now U.S. Pat. No. 5,479,324.

BACKGROUND OF THE INVENTION

1. Field of the Invention

The present invention relates generally to motorcycles and more particularly to installing illumination means within the gasoline tank area of a motorcycle.

2. Description of the Prior Art

The motorcycle has been a means of fun and relatively inexpensive way of traveling for many years. Recently, the motorcycle has found increased popularity and has become widely accepted by a substantial portion of the purchasing public as their primarily means of traveling. Accordingly, sales figures for various motorcycle companies have reached new highs in recent years.

One problem which has continuously plagued motorcyclist is the visibility of the motorcycle while riding especially during night travel. This problem is further emphasized by the fact that many motorcyclist wear dark clothing when riding. Thus, many accidents involving motorcycles are the result of the non-motorcyclist failing to see the motorcyclist. As the motorcycle itself provides minimal, if any, protection to the motorcyclist, many accidents involving motorcycles result in serious bodily injury or even death to the motorcyclist. Such severe consequences often occur at relatively low traveling speeds.

In the automobile and truck industry the advent of neon lighting, ranging in various colors, around the license plate and/or under the frame of the vehicle has recently been used to enhance the visibility of the vehicle during nighttime driving as well as acting as novelty device. However, the use of neon lighting is not as readily adaptable or applicable to motorcycles.

Another problem is the fact that many motorcyclists remove or disconnect the turn signals from their motorcycle feeling that the signals take away from the aesthetic features of the motorcycles as well as their own individuality. Thus, frequently no indication is given to other vehicles on the road when these motorcyclists are preparing to turn which in turn results in unnecessary accidents.

Additionally, conventional motorcycle headlights merely illuminates the area approximately twenty-five (25) feet ahead of the motorcycle. Thus, the rider is normally not aware of the surface conditions on either side of the motorcycle or directly in front of the motorcycle. Several problems immediately become apparent from the lack of illumination around the motorcycle, including the inability to detect glass, sand, tires, or other items which may be disposed on the surface to which the rider is approaching or is about to turn onto. As such, serious injuries may occur which may have been prevented by improved or proper illumination around the motorcycle.

Thus, what is needed in the art is a device or apparatus that allows for better illumination and visibility of the motorcycle, as well as for the rider of the motorcycle, during night traveling. In addition, the device must be safe and not increase the chance of serious injury. It is, therefore, to the effective resolution of the aforementioned problems and shortcomings that the present invention is directed.

SUMMARY OF THE INVENTION

Generally, the invention relates to an illuminated gasoline tank for a motorcycle. A gasoline tank is constructed with a double-walled, hollow space allowing light to be visible externally through a variety of openings (designs). The design can incorporate solid or flashing lights, or could be used as substitute turn signals.

In the first embodiment, at least one, and preferably both, outside portions of an existing gasoline tank are removed thus creating concave side panel portions and an opening in the sides of the gasoline tank. The side panels are removed by conventional means such as laser cutting, sawing, etc. A flat side piece, with illumination means attached thereto, is welded to the gasoline tank at the side opening to seal the gasoline tank. An opening or design is created in the concave side panel and the side panel is welded back onto its original position on the side of the gasoline tank. A wire or cord which is connected to the illumination means, is attached to the motorcycle battery, turn signal, etc. to generate light through the opening on the side panel when desired.

In a second embodiment, the gasoline tanks are manufactured with the flat side piece and illumination means, and also are provided with connecting means for attachment of one of a plurality of side panels. In this embodiment various design side panels can be interchanged by the motorcyclists to suit his or her individual style. Thus, a multitude of transparent inserts (mounted internally) can be utilized to change the outward appearance of the illuminated gasoline tank.

In a third embodiment, a lighting means is provided underneath the gas tank to help illuminate the area in front and to the sides of the motorcycle. The lighting member is attached to the bottom surface of each side of the motorcycle tank by conventional means, such as velcro, tape, gluing, adhesives, etc. The lighting means is provided with a reflective surface area which reflects light received a light bulb in the direction in front of the motorcycle and to the side of the motorcycle corresponding to the side of the gasoline tank to which the motorcycle is attached. Thus, the lighting means illuminates the side and front areas adjacent the motorcycle to allow the rider to have better familiarity with the surroundings during nighttime travel.

In either embodiment the original shape of the gasoline tank is not altered. Therefore, the motorcycle retains its original look.

It is an object of the present invention to enhance the visibility of a motorcycle during nighttime travel while not altering the original look of the motorcycle.

It is another object of the present invention to provide additional safety to a motorcyclist during nighttime travel.

It is a further object of the present invention to reduce the number of motorcycle related accidents.

It is yet another object of the present invention to increase the aesthetic beauty of a motorcycle.

It is still another object of the present invention to provide additional lighting on a motorcycle.

It is an even still further object of the present invention to provide additional lighting around the adjacent front and side area of a motorcycle.

Other objects and advantages of this invention will become apparent from the following description taken in conjunction with the accompanying drawings wherein set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

The invention may be better understood by reference to the drawings in which:

FIG. 7 is a perspective view of a third embodiment of the present invention;

FIG. 8 is a front elevational view illustrating the third embodiment of the present invention attached to a left tank of a split motorcycle gasoline tank;

FIG. 9 is a side elevational view illustrating the third embodiment of the present invention attached to a motorcycle gasoline tank; and FIG. 10 is a bottom plan view illustrating the third embodiment of the present invention attached to a motorcycle gasoline tank.

DETAILED DESCRIPTION OF THE INVENTION

Figure 1:
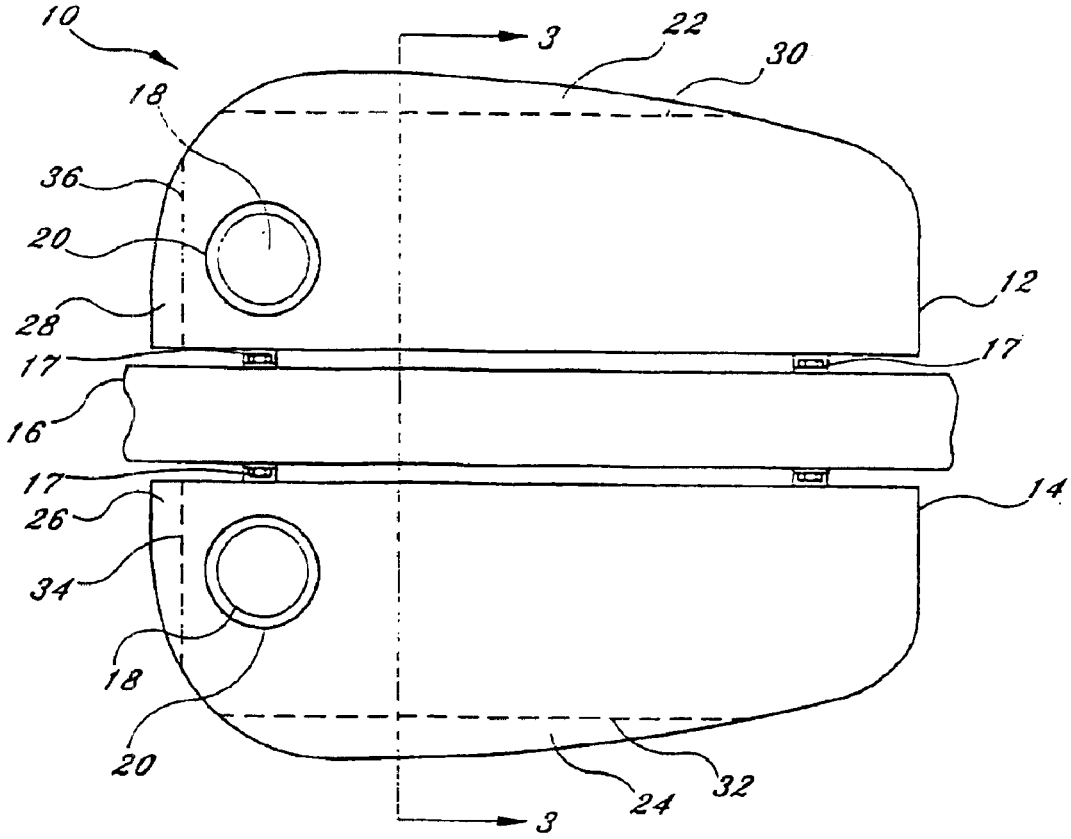
FIG. 1 is a top plan view of a motorcycle gasoline tank.
Figure 2:
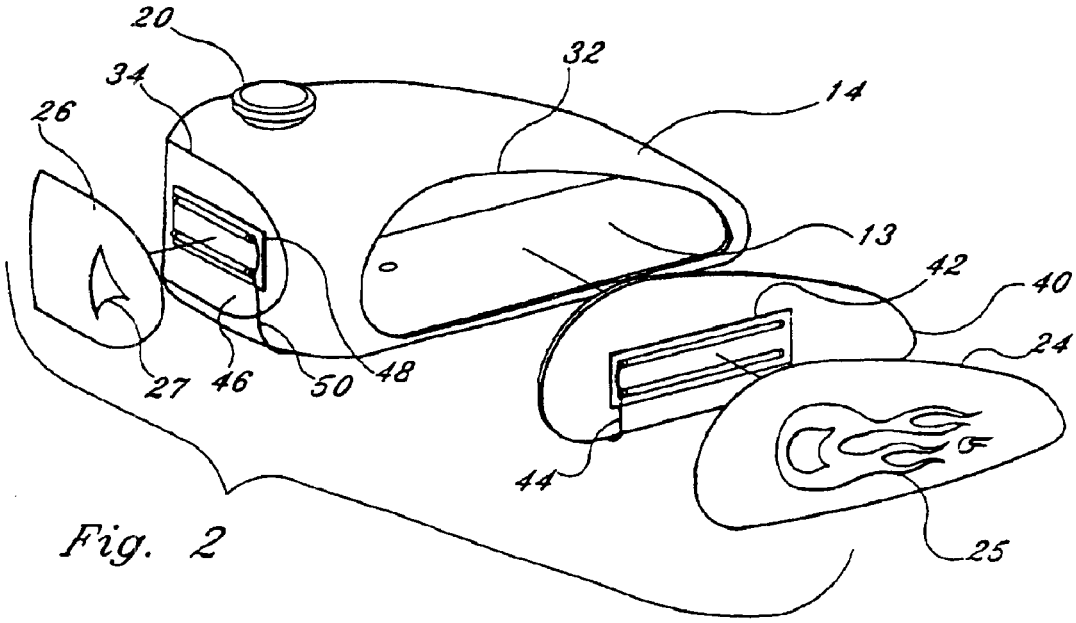
FIG. 2 is isometric exploded view of the first embodiment of the present invention.
Figure 3:
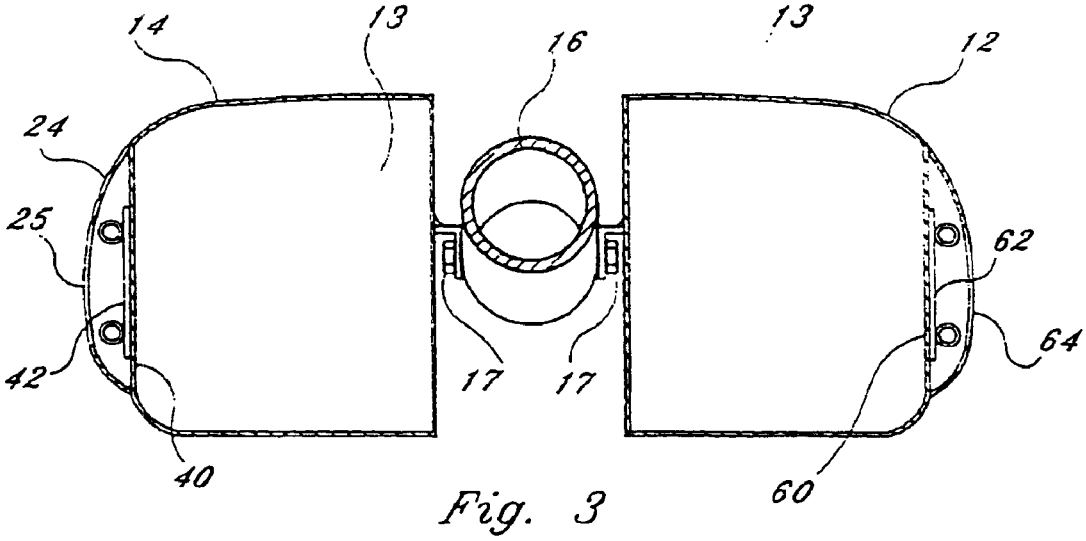
FIG. 3 is a sectional view taken along the line 3—3 of FIG. 1.
Figure 4:
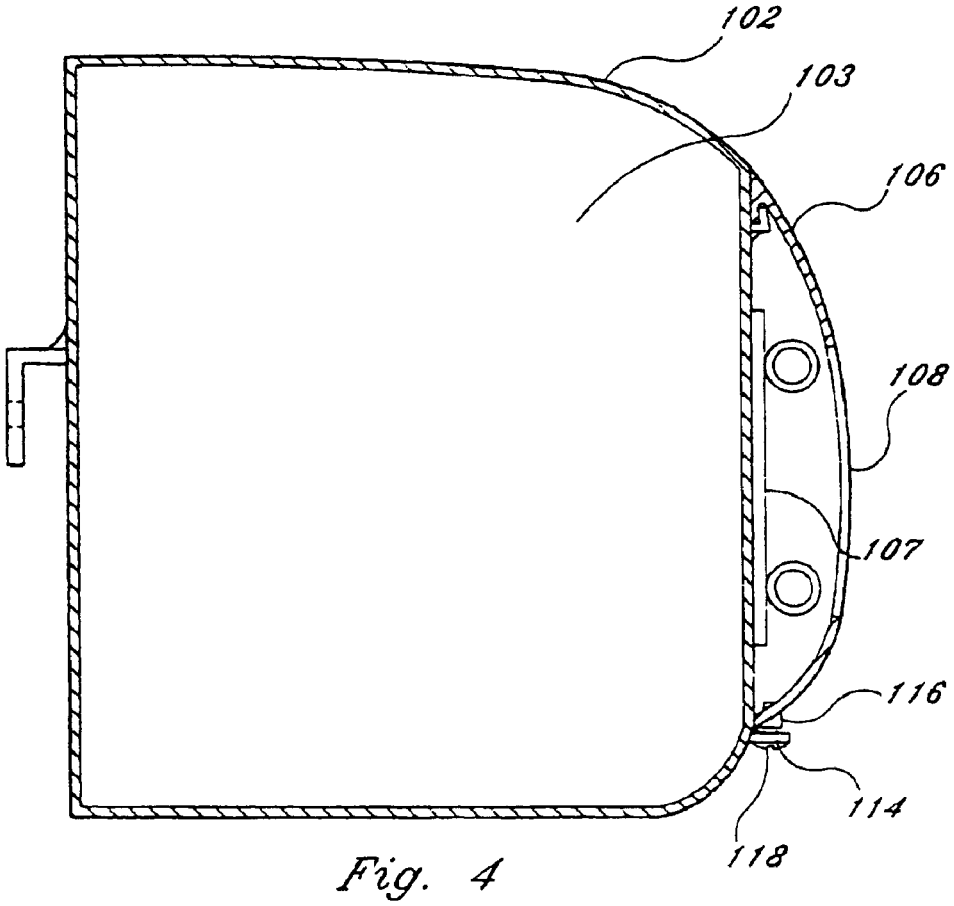
FIG. 4 is a sectional view of the second embodiment of the present invention.

The first embodiment of the present invention is shown in FIGS. 1–3. As seen in FIG. 1 a split gasoline tank 10 is generally shown as having a left side tank 14 and a right side tank 12 removably connected to the motorcycle frame 16 by a series of bracket/bolt combinations 17. Fluid openings 18 are disposed on the top of tanks 12 and 14. A fluid cap 20 is also provided on the top of tanks 12 and 14 for sealing openings 18 as is conventional in the art. Gasoline tank 10 is disposed between the seat (not shown) and forks (not shown) of a motorcycle, typically at seat level.

As seen in the drawings a portion of the outside surfaces of tanks 12 and 14 as well as a portion of the front surfaces of the tanks is removed by conventional means, such as laser cutting, sawing, etc. Preferably, to create a uniformed look and to not destroy the aesthetics of the motorcycle, if one side portion is removed and altered in accordance with the present invention, then the other side portion will also be removed. However, the invention is not limited to such arrangement, and it is within the scope of the present invention to remove only a single outside portion. These design arrangements also apply to the front surface portion of tanks 12 and 14. Thus, any combination of the outside surfaces and front surfaces of tanks 12 and 14 is within the scope of the present invention. Furthermore, one or both of the front surfaces alone or one or both of the outside surfaces alone can also be removed and is within the scope of the present invention.

Though gasoline tank 10 is shown as a split tank, it is to be understood that this is not limiting and it is within the scope of the present invention to utilize a single tank gasoline tank in replace of the split tank. Furthermore, the location of the gasoline tank on some brands of motorcycles is different than that described above. These motorcycles typically place the gasoline tank underneath the seat of the motorcycle and place a hollow shell resembling a gasoline tank between the seat and forks. Thus, it is also to be understood, that these hollow shells are also within the scope of the present invention. Accordingly, all references to a "tank" hereinafter shall also mean a hollow shell.

As mentioned above, an outside surface portion and a front surface portion can be removed from tank 14 to create a side panel 24 and a front panel 26. However, the removal of such panels does not affect the location or function of opening 18 and gas cap 20. The removal of panels 24 and 26 from tank 14 create openings 32 and 34, respectively, exposing the inside area 13 where the gasoline is normally retained. Thus, to establish a gasoline tank flat side panel 40 and flat front panel 46 are welded into openings 32 and 34, respectively. Similarly, as seen in FIG. 1, if the outside surface portion and front surface portion of tank 12 are removed, openings 30 and 36, respectively will be created. In this situation the removal of these surface portions creates second side panel 22 and second front panel 28. Thus, to establish a gasoline tank with these surface portions removed, a second flat side panel 60 (FIG. 3) and a second flat front panel (not shown) are also welded into openings 30 and 36, respectively.

Illumination means 42 is shown attached to the outside surface of flat side panel 40 by conventional means such as screws, bolts, glue, hook and loop fasteners, etc. Similarly, illumination means 48 is shown attached to flat front panel 46. Illumination can be at least one light circuit and one light bulb. Electrical wires or cords 44 and 50 are shown attached to and hanging down from illumination means 42 and 48, respectively. Cords 44 and 50 are attached to the motorcycle battery (not shown) or other electrical circuits of the motorcycle according to the pattern of light desired, i.e. continuously on, flashing, wired to flash in conjunction with turning, etc.

An opening 25 and 27 is provided through panels 24 and 26, respectively in order to see illumination means 42 and 48, respectively. Opening 25 or 27 can be of any design desired by the motorcyclist to correspond with the motorcyclist's image. All that is necessary is that sufficient light, from the respective illumination means, is seen through openings 25 and 27. Preferably, openings 25 and 27 can be created by laser cutting, which provides the accuracy when a detailed design opening is required. However, the present invention is not limited to such and other conventional detail cutting methods are within the scope of the present invention. Clear or different colored tint glass can be inserted in openings 25 or 27 to provide protection to illumination means 42 and 48, respectively.

Figure 6:
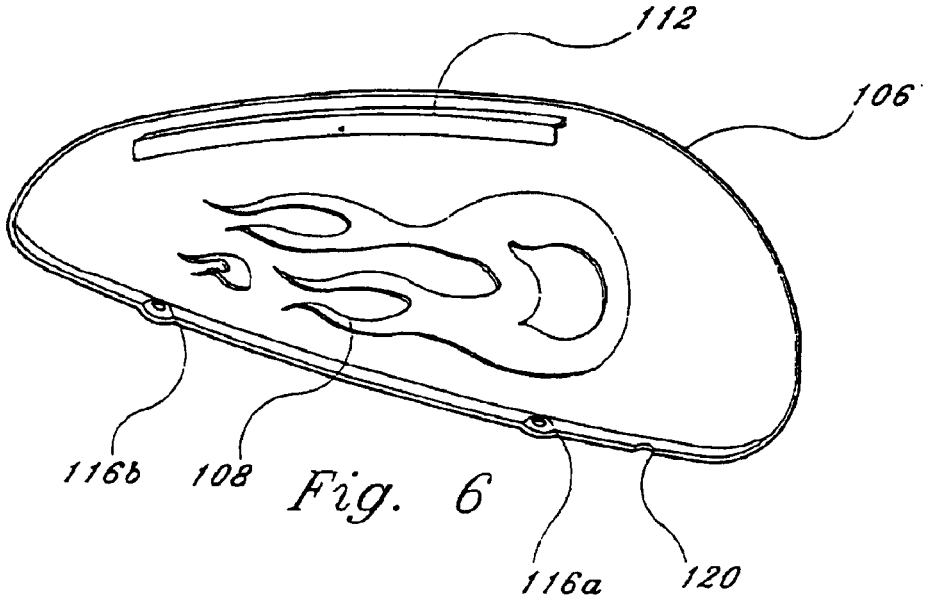
FIG. 6 is a perspective view of side panel shown in FIG. 5.

Once flat panels 40 and 46 have been welded to tank 14 at openings 32 and 34, respectively, panels 24 and 26, with their respective designs or openings 25 and 27, are ready to be attached to their respective original positions on tank 14. Panels 24 and 26 are attached by conventional means such as welding. A notch (see second embodiment FIG. 6) is provided in the bottom of panels 24 and 26 to create a passageway for cords 44 and 50. However, it is to be understood that the notch can be located anywhere on the panels and still be within the scope of the present invention. All that is required is that access is provided for the cords to the motorcycle's battery, electrical circuitry or wherever the cords are to be connected. After panels 24 and 26 are welded, tank 14 is repainted. Once repainted one viewing the tank will not be able to see that portions of the tank had been removed or altered.

Figure 5:
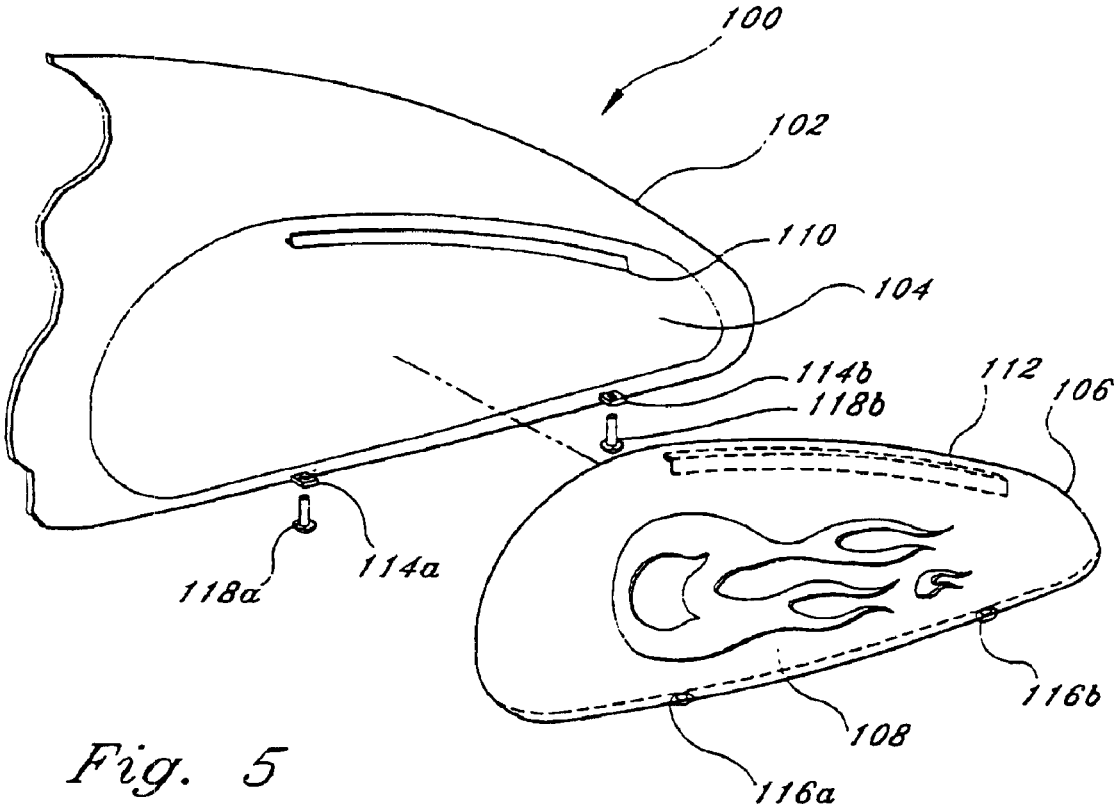
FIG. 5 is a isometric exploded view of the second embodiment of the present invention.

In the second embodiment of the present invention gasoline tank 102 is manufactured with flat side panel 104 or flat front panel (not shown) integrally constructed. Thus, the outline lines of flat side panel 104 shown in FIG. 5 are for illustration purposes only and do not appear on the commercial embodiment of the present invention, since the flat panel is part of the original constructed gasoline tank 102.

In this second embodiment, tank 102 is provided with connections means for attachment of one of a plurality of side panels 106. In the preferred embodiment, the connection means includes an elongated L-shaped bracket 110 attached to the outer surface of flat side panel 104 which is removably connected to a corresponding elongated L-shaped bracket 112 attached to the inner surface of side panel 106. Bracket 112 is positioned inverted from bracket 110 to provide an interlock connection between the two brackets. Preferably, brackets 110 and 112 are welded to panels 104 and 106, respectively. Side panel retaining means is provided to help maintain the interlock between brackets 110 and 112. In the preferred embodiment, the retaining means is at least one nut 114, preferably two nuts (114a and 114b), welded to the bottom of tank 102. Corresponding nuts 116a and 116b (116 if only a single nut) are provided on the bottom of panel 106. However, the location of the retaining means will depend on the location of the connection means. All that is required is that side panel 106 does not come off during traveling. As such, various different locations along tank 102 for the connection means and retaining means are possible and are within the scope of the present invention.

Thus, to connect panel 106 to flat panel 104, bracket 112 is inserted within the channel disposed between by bracket 110 and flat panel 104. Panel 106 is pivoted around this mating point until nuts 116a and 116b are properly aligned with nuts 114a and 114b, respectively. Bolts 118a and 118b (118 if only a single nut) are inserted through the aligned centerholes of nuts 114a, 116a and 114b, 116b, respectively, to retain panel 106 in its locked position with panel 104. Alternatively, small locks (not shown) can be inserted through the centerholes of nuts 114a, 116a and 114b, 116b to help prevent panel 106 from being stolen.

Illumination means 107 can be provided attached to flat side panel 104 during the construction of gasoline tank 102. Similar to the first embodiment, illumination means 107 can be at least one light circuit and one light bulb. An electrical wire or cord (see first embodiment, not shown in second embodiment) is attached to and hanging down from illumination means 107. The cord is attached to the motorcycle battery (not shown) or other electrical circuits of the motorcycle according to the pattern of light desired, i.e. continuously on, flashing, wired to flash in conjunction with turning, etc. A notch 120 is provided in the bottom of panel 106 to create a passageway for the cord. However, it is to be understood that the notch can be located anywhere on the panel and still be within the scope of the present invention. All that is required is that access is provided for the cord to the motorcycle's battery, electrical circuitry or wherever the cords are to be connected.

If illumination means 107 is provided, then panel 106 must have an opening 108 in order to see such illumination. Opening 108 can be any design desired by the motorcyclist to correspond with the motorcyclist's image. All that is necessary is that sufficient light, from the illumination means, is seen through openings 108. Preferably, opening 108 is created by laser cutting, which provides the accuracy when a detailed design opening is required.

The second embodiment of the present invention can alternatively be used to allow the motorcyclist to have interchangeable side panels to suit his or her individual style. In such case, the motorcyclist chooses one from a plurality of side panels to be removably attached to the motorcycle's gasoline tank or shell. The side panel is attached with the connection means and retaining means described above. However, when attaching to a shell, the flat side panel is not required as long as connection means and retaining means is provided on the shell itself. In this alternative second embodiment no illumination means or notch is required. Thus, it is optional whether to create an opening in the side panel. In the preferred embodiment, no opening would be created and the side panel would have different designs painted on its outside surface.

When it is desired to replace or interchange the side panel disposed on tank 102 with a different panel, bolts 118a and 118b are removed nuts 114a, 114b and 116a, 116b, respectively, thus releasing the retaining connections of the nuts. The interconnection between brackets 110 and 112 is also released, thus, allowing the side panel to be removed. A different side panel, having the same connection means and retaining means in design and position as the replaced side panel, is then connected to tank 102 as described above for side panel 106. Thus, the second embodiment of the present invention provides the motorcyclist with a limitless amount of design patterns for the tank of his or her motorcycle.

It is to be understood that the teachings of the different embodiments of the present invention can be applied to either of the front surface or either of the side surfaces of the gasoline tank or shell. For example, though the second embodiment only discusses one side panel it is to be understood that such teaching is applicable to either side panel as well as either front panel. Additionally, though the first embodiment only describes a single front surface and a single side surface, it is to be understood that such teaching is applicable to either side panel as well as either front panel.

In a third embodiment, an external lighting means 302 is provided underneath a motorcycle gas tank 300, which is attached to the motorcycle frame 301, to help illuminate the area in front and to the sides of the motorcycle. It is to be understood that external lighting means 302 can be utilized with a single gasoline tank or a split gasoline tank. Preferably, external lighting means 302 are provided on both sides of tank 300 to illuminate both side areas adjacent to the motorcycle.

Lighting means 302 is attached to a bottom surface 303 of each side of motorcycle tank 300 by conventional means, such as velcro, tape, gluing, adhesives, etc. Preferably, lighting means 302 is attached to bottom surface 303 as close as possible to the motorcycle frame or along inner edge 305 of bottom surface 303. However, such is not limiting and lighting means may be attached along any area of bottom surface 303.

External lighting means 302 includes an L-shaped transparent member 304, preferably constructed from glass or plastic, which is attached to a curved body member 312. However, other materials for transparent member 304 may be utilized and are within the scope of the invention. Transparent member 304 includes transparent surfaces 306, 308 and 310, while curved body member 312 is provided with an reflective inner surface area 314. Reflective surface 314 may be a foil member or a shiny glossy inner surface.

However, such is not limiting and any reflective means may be provided for inner surface 314 of body member 312.

Due to the predefined curved shape of body member 312, surface 314 reflects light received from illumination member 320 through transparent surfaces 306, 308 and 310 to illuminate the side and front areas adjacent the motorcycle to allow the rider to have better familiarity with the surroundings during nighttime travel. Lighting means 302 illuminates the entire side and front of the motorcycle and the surrounding area adjacent thereto and also highlights the chrome of the motorcycle engine to provide additional visibility of the motorcycle for safety purposes.

An aperture 316 is provided in curved body member for passing through a cord 318 which is attached at one end to illumination member 320 and at the other end to the motorcycle circuitry (not shown) to provide power to illumination member 320. Alternatively, illumination member 320 may be powered by other conventional means including, but not limited to, a wheel generator or battery means, such as a 9 volt battery (not shown), to eliminate the need for cord 318 and aperture 316. Transparent member 304 can be removably attached to body member 312 to allow for replacement of bulb 320. Alternatively, transparent member 304 is permanently attached to body member 312, and the entire external lighting means 302 is replaced once illumination member 320 has burned out.

Illumination member 320 can be a light bulb or low voltage fluorescent tube. Furthermore, it is to be understood that other illumination means may be utilized which will illuminate the side and front areas adjacent the motorcycle. Clips 330 can be attached, by conventional means, to body member 312, to securely hold illumination member 320 in place. Other holding means, such as brackets, adhesives, etc., may be provided in lieu of clips 330, and are considered within the scope of the present invention.

Illumination member 320 may be wired to be on while the motorcycle engine is turned on, or can be wired to be on only in certain situations, such as wiring to the turn signal circuitry. When on, lighting means 302 gives the motorcycle a wider image to help other drivers see the motorcycle during nighttime travel, while also improving the motorcyclist's visibility of the adjacent surroundings during nighttime travel, both resulting in increased safety to the motorcyclists, as well as other drivers and civilians.

*Thus, a motorcycle gasoline tank or motorcycle hollow body shell disposed where a conventional motorcycle gasoline tank is normally disposed is provided and comprises a body member shaped as a motorcycle gasoline tank and an illumination member secured to said body member such that light from said illumination member is directed away from said body member. The body member is adapted for attachment to a frame of a motorcycle where a motorcycle gasoline tank is normally disposed. The body member is defined by a front half portion and a back half portion and at least a portion of the illumination member is secured to the front half portion of said body member. The front half portion being closer to a front area of a motorcycle to which the body member is attached. The illumination member illuminates a surrounding ground area adjacent to the motorcycle to which the body member is attached.*

*A device is also provided for illuminating a ground area adjacent a motorcycle and comprises an illumination assembly adapted for attachment to a motorcycle gasoline tank or a motorcycle hollow body shell disposed where a conventional motorcycle gasoline tank is normally disposed such that light from the illumination assembly is directed away from the motorcycle gasoline tank or motorcycle hollow body shell to illuminate a ground area adjacent the motorcycle. In one embodiment, at least a portion of the illumination assembly is adapted for attachment to a front half portion of the gasoline tank or motorcycle hollow body shell. The front half portion is closest to a front area of the motorcycle to which the gasoline tank or motorcycle hollow body shell is attached.*

*A method is also disclosed for illuminating a ground area adjacent a motorcycle, where the motorcycle has a motorcycle gasoline tank or a motorcycle hollow body shell disposed where a conventional motorcycle gasoline tank is normally disposed. The method comprises the step of attaching an illumination assembly to the motorcycle gasoline tank or motorcycle hollow body shell such that light from the illumination assembly is projected away from the motorcycle gasoline tank or motorcycle hollow body shell to illuminate a ground area adjacent the motorcycle. In one embodiment, the step of attaching an illumination assembly includes attaching the illumination assembly to a front half portion of the gasoline tank or motorcycle hollow body shell. The front half portion is closest to a front area of the motorcycle to which the gasoline tank or motorcycle hollow body shell is attached.*

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim is:

1. An external illumination device disposed underneath a gasoline tank of a motorcycle or a hollow body shell disposed where a conventional motorcycle gasoline tank is normally disposed, to provide light to an adjacent side and front ground area to help aid in the visibility of the motorcycle while also improving the visibility of the surroundings to a motorcyclist while he or she is riding the motorcycle, the gasoline tank or shell having a bottom surface portion, said external illumination device comprising:

a body member having an outer surface and an inner surface, the inner surface of said body member provided with a reflective member, the outer surface of said body member attached to a bottom surface of said motorcycle gasoline tank; and an illumination member operatively connected to said body member;

said illumination member provides light which is reflected by the reflective member and illuminating the adjacent side and front ground area around the motorcycle while improving the visibility of the surrounding to the motorcyclist.

2. The external illumination device of claim 1, further including a transparent member attached to said body member, wherein the light reflected by said reflective member is passed through the transparent member.

3. The external illumination device of claim 1, wherein said body member is curved shaped.

4. The external illumination device of claim 1, wherein said body member is removably attached to the bottom surface of said motorcycle gasoline tank.

5. The external illumination device of claim 4, wherein said body member is removably attached adjacent an inner edge of the bottom surface of said motorcycle gasoline tank.

6. The external illumination device of claim 1, wherein said body member is attached adjacent an inner edge of the bottom surface of said motorcycle gasoline tank.

7. The external illumination device of claim 1, wherein said illumination member is replaceable.

8. An external illumination device disposed underneath a gasoline tank of a motorcycle or a hollow body shell disposed where a conventional motorcycle gasoline tank is normally disposed, to provide light to an adjacent side and front ground area to help aid in the visibility of the motorcycle while also improving the visibility of the surroundings to a motorcyclist while he or she is riding the motorcycle, the gasoline tank or shell having a bottom surface portion, said external illumination device comprising:

a body member having an outer surface and an inner surface, the inner surface of said body member provided with a reflective member, the outer surface of said body member attached to a bottom surface of said motorcycle gasoline tank; and an illumination member operatively associated with said body member;

wherein said illumination member provides light which is reflected by the reflective member and illuminating the adjacent side and front ground area;

said illumination member is removably attached to said body member by at least one clip member, said clip member attached to said body member and depending therefrom.

9. An external illumination device disposed underneath a gasoline tank of a motorcycle or a hollow body shell disposed where a conventional motorcycle gasoline tank is normally disposed, to provide light to an adjacent side and front ground area to help aid in the visibility of the motorcycle while also improving the visibility of the surroundings to a motorcyclist while he or she is riding the motorcycle, the gasoline tank or shell having a bottom surface portion, said external illumination device comprising:

a curved body member having an outer surface and an inner surface, the inner surface of said curved body member provided with a reflective member, the outer surface of said curved body member attached to a bottom surface of said motorcycle gasoline tank;

a transparent member attached to said curved body member forming an area; and an illumination member disposed within said area formed by said transparent member and said curved body member;

said illumination member provides light which is reflected by the reflective member through the transparent member and illuminating the adjacent side and front ground area around the motorcycle while improving the visibility of the surrounding to the motorcyclist.

10. The external illumination device of claim 9, wherein said curved body member is removably attached to the bottom surface of said motorcycle gasoline tank.

11. The external illumination device of claim 10, wherein said curved body member is removably attached adjacent an inner edge of the bottom surface of said motorcycle gasoline tank.

12. The external illumination device of claim 9, wherein said curved body member is attached adjacent an inner edge of the bottom surface of said motorcycle gasoline tank.

13. The external illumination device of claim 9, wherein said illumination member is replaceable.

14. The external illumination device disposed underneath a gasoline tank of a motorcycle or a hollow body shell disposed where a conventional motorcycle gasoline tank is normally disposed, to provide light to an adjacent side and front ground area to help aid in the visibility of the motorcycle while also improving the visibility of the surroundings to a motorcyclist while he or she is riding the motorcycle, the gasoline tank or shell having a bottom surface portion, said external illumination device comprising:

a curved body member having an outer surface and an inner surface, the inner surface of said curved body member provided with a reflective member, the outer surface of said curved body member attached to a bottom surface of said motorcycle gasoline tank;

a transparent member attached to said curved body member forming an area; and an illumination member disposed within said area formed by said transparent member and said curved body member;

said illumination member provides light which is reflected by the reflective member through the transparent member and illuminating the adjacent side and front ground area;

said illumination member is removably attached to said curved body member by at least one clip member, said clip member attached to said curved body member and depending therefrom.

15. The external illumination device disposed underneath a gasoline tank of a motorcycle or a hollow body shell disposed where a conventional motorcycle gasoline tank is normally disposed, to provide light to an adjacent side and front ground area to help aid in the visibility of the motorcycle while also improving the visibility of the surroundings to a motorcyclist while he or she is riding the motorcycle, the gasoline tank or shell having a bottom surface portion, said external illumination device comprising:

a curved body member having an outer surface and an inner surface, the inner surface of said curved body member provided with a reflective member, the outer surface of said curved body member attached to a bottom surface of said motorcycle gasoline tank;

a transparent member attached to said curved body member forming an area; and a replaceable illumination member disposed within said area formed by said transparent member and said curved body member, said illumination member removably attached to said curved body member by at least one clip member, said clip member attached to said curved body member and depending therefrom;

said illumination member provides light which is reflected by the reflective member through the transparent member and illuminating the adjacent side and front ground area.

16. The external illumination device of claim 15 wherein said curved body member is removably attached to said motorcycle gasoline tank, adjacent an inner edge of the bottom surface of said motorcycle gasoline tank.

*17. A motorcycle gasoline tank or motorcycle hollow body shell disposed where a conventional motorcycle gasoline tank is normally disposed on a motorcycle, the motorcycle having a frame, the motorcycle gasoline tank or motorcycle hollow body shell comprising:*

*a body member shaped as a motorcycle gasoline tank and adapted for attachment to the frame of the motorcycle where a conventional motorcycle gasoline tank is normally disposed; and*

*an illumination member secured to said body member such that light from said illumination member illumi-*

*nates an adjacent side and front ground area around the motorcycle;*

*wherein a portion of said body member is removed and at least a portion of said illumination member is disposed therein.*

*18. A device for illuminating a ground area adjacent a motorcycle, said device comprising:*

*an illumination assembly having a reflective member and adapted for attachment to a motorcycle gasoline tank or a motorcycle hollow body shell disposed where a conventional motorcycle gasoline tank is normally disposed such that light from said illumination assembly is directed away from the motorcycle gasoline tank or motorcycle hollow body shell to illuminate an adjacent side and front ground area around the motorcycle.*

*19. The device of claim 18 wherein at least a portion of said illumination assembly is adapted for attachment to a front half portion of the gasoline tank or motorcycle hollow body shell; wherein the front half portion is closest to a front area of the motorcycle to which said gasoline tank or motorcycle hollow body shell is attached.*

*20. A motorcycle gasoline tank or motorcycle hollow body shell disposed where a conventional motorcycle gasoline tank is normally disposed on a motorcycle, the motorcycle having a frame, the motorcycle gasoline tank or motorcycle hollow body shell comprising:*

*a body member shaped as a motorcycle gasoline tank and adapted for attachment to the frame of the motorcycle where a conventional motorcycle gasoline tank is normally disposed; and*

*an illumination member secured to said body member such that light from said illumination member illuminates an adjacent side and front ground area around the motorcycle;*

*wherein said illumination member having a reflective element for directing the light.*

*21. A device for illuminating a ground area adjacent a motorcycle, said device comprising:*

*an illumination assembly adapted for attachment to a motorcycle gasoline tank or a motorcycle hollow body shell disposed where a conventional motorcycle gasoline tank is normally disposed such that light from said illumination assembly is directed away from the motorcycle gasoline tank or motorcycle hollow body shell to illuminate an adjacent side and front ground area around the motorcycle; wherein said illumination assembly having a reflective element for directing the light.*

*22. A motorcycle gasoline tank or motorcycle hollow body shell disposed where a conventional motorcycle gasoline tank is normally disposed, comprising:*

*a non-transparent body member shaped as a motorcycle gasoline tank and adapted for attachment to a frame of a motorcycle where a conventional motorcycle gasoline tank is normally disposed; and*

*an illumination member secured to said body member;*

*wherein said illumination member having a reflective element for directing light generated by said illumination member to illuminate an adjacent side and front ground area around the motorcycle.*

*23. A method for illuminating a front and front side ground area adjacent a motorcycle, the motorcycle having a motorcycle gasoline tank or a motorcycle hollow body shell disposed where a conventional motorcycle gasoline tank is normally disposed, said method comprising the step of:*

*attaching an illumination assembly having a reflective element to a motorcycle gasoline tank or motorcycle hollow body shell attached to a motorcycle frame where a conventional motorcycle gasoline tank is normally attached such that light from said illumination assembly is projected away from the motorcycle gasoline tank or motorcycle hollow body shell to illuminate the front and side ground area adjacent the motorcycle.*

*24. The method for illuminating of claim 23 wherein the step of attaching an illumination assembly includes attaching the illumination assembly to a front half portion of the gasoline tank or motorcycle hollow body shell; wherein the front half portion is closest to a front area of the motorcycle to which said gasoline tank or motorcycle hollow body shell is attached.*

* * * * *